Inventors
Isabel C. Percival
Joseph E. Tierney

United States Patent Office 2,717,170
Patented Sept. 6, 1955

2,717,170

SAFETY SEAL

Isabel C. Percival and Joseph E. Tierney,
Ottawa, Ontario, Canada

Application October 3, 1952, Serial No. 312,984

6 Claims. (Cl. 292—325)

This invention relates to safety seals and one object of the invention is to provide a seal which cannot be tampered with without leaving plain evidence that said tampering has taken place.

Another object is to provide a one piece seal that may be closed entirely by hand without the use of tools of any kind.

Another object is to provide a seal of distinctive configuration that can be readily distinguished from others.

A further object is to provide a seal having no parts upstanding that may accidentally catch on any objects to open the seal.

Figure 1:
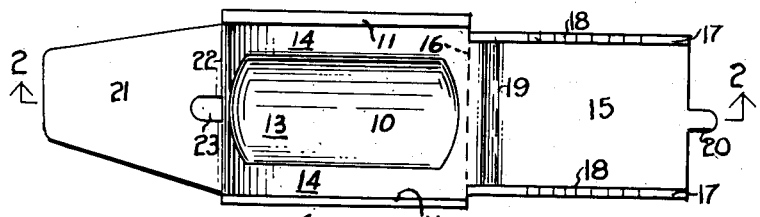
Figure 2:
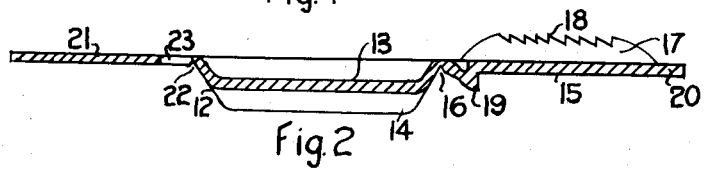
Figure 3:
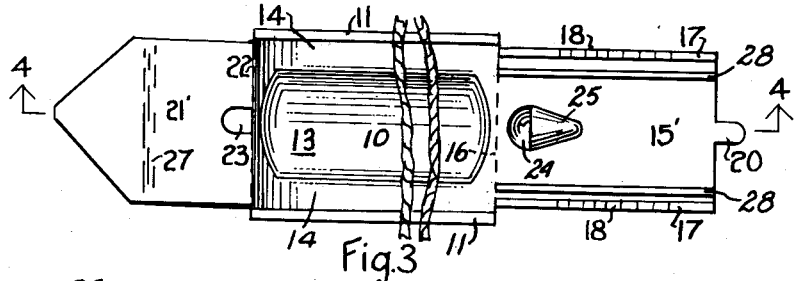
Figure 4:
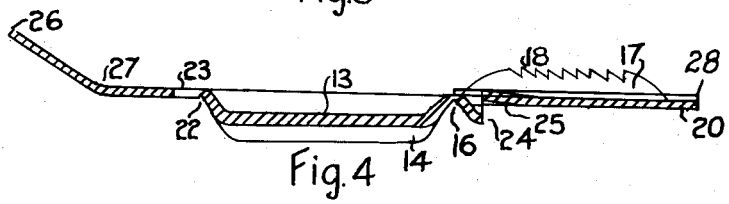
Figure 5:
Figure 7:
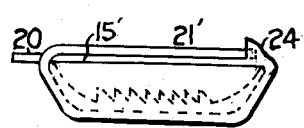
Figure 6:
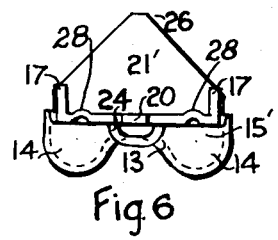
Figure 8:
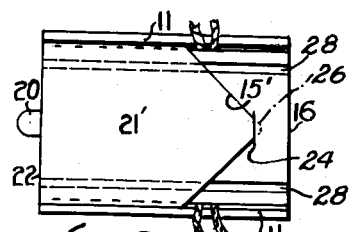

In the accompanying drawings two forms of the invention are shown, in which:

Figure 1 is a plan view of one form of the seal open.
Figure 2 is a section on the line 2—2 of Figure 1.
Figure 3 is a plan view of a slightly modified form of the seal open, with cords placed thereon.
Figure 4 is a section on the line 4—4 of Figure 3.
Figure 5 is a side elevation of the seal of Figures 1 and 2 in closed position.
Figure 6 is an end elevation of the seal of Figure 3 from the right side of said figure.
Figure 7 is a side elevation of the seal of Figures 3 and 4 in closed position.
Figure 8 is a plan view of the seal of Figures 3 and 4 showing cords clamped therein.

The one piece safety seal is stamped from sheet material and consists of a base portion 10 having upturned sides 11, upsloped ends 12 and a bold central corrugation lengthwise thereof forming a channel 14 on each side of a central rib 13.

At one end of the base an intermediate leaf 15 is connected to the base 10 by a weakened portion, this weakening being accomplished by a scoring or groove 16 extending transversely across the seal. The leaf 15 has upstanding flanges 17 along its longitudinal edges terminating in serrations forming teeth 18 to grip cords or the like. The spacing between the flanges 17 is narrower than that between the sides 11 of the base. A transverse rib 19 may be downstruck across the leaf between the flanges 17. A tongue 20 inwardly spaced from the longitudinal edges of the leaf projects from the free end thereof.

At the other end of the base portion a third section 21 connects with the base at a second weakened line produced by a scoring or groove 22. This section 21 has an orifice 23 corresponding in position and shape to the tongue 20 intermediate the ends of the transverse scoring 22. The section is shorter than the leaf and may be slightly tapered towards the free end thereof.

The modified form shown in Figures 3, 4, 6, 7 and 8 has the base 10 exactly the same as in Figures 1, 2 and 5 but the leaf 15', instead of the rib 19, has a small cut through the material and a housing 24 downstruck therefrom with a slightly raised portion 25 forming a shallow groove on the underside leading to the housing. The third section 21' is tapered to a blunt point 26 as shown in Figures 3, 6 and 8. In this form the section 21' is slightly longer than 21 and is transversely bent at 27 intermediate its ends, so that when bent over onto the leaf 15' and straightened out the point 26 will enter the housing 24.

In operation the cords or other objects to be sealed are placed across the base portion 10. The leaf 15 is then bent over at the scoring 16 onto the base 10, the serrated flanges 17 of the leaf forcing the cords into the bottoms of the channels 14 and the teeth 18 gripping them there, the tongue 20 passing into the orifice 23 of the third section. This third section 21 is then bent at the scoring 22 up through 180° to lie flat on the intermediate leaf 15, with the free end thereof abutting the transverse rib 19 of the leaf to prevent anything accidentally dragged across the seal from raising the third section. The tongue 20 will then project from the end of the folded seal through the orifice 23.

In the form shown in Figures 3, 4, 6, 7 and 8 the leaf 15' is bent over at the score line 16, the tongue 20 engaging in the orifice 23. This bending will leave the housing 24 upstanding and the portion 25 a shallow groove leading thereto. The third section 21' is then bent over at the scoring 22, the point 26 engaging in the shallow groove 25. Further pressure straightens out the bend 27 and causes the point 26 to slide along the groove 25 and enter the housing 24. This makes a more positive insurance against anything accidentally raising the portion 21'.

If attempt is made to open the seal by lifting the third section, this must be opened to nearly 180° before the tongue 20 will clear the orifice 23. This opening will cause the section 21 or 21' to break off at the scoring 22. We are aware that it has previously been proposed to provide two tongues, one at each edge of the leaf with a cut out on either side of the third section the cut outs clearing the tongues when the third section is folded onto the leaf; this is objectionable as the sides of the section may be bent up to clear the tongues when the third section is only partially raised, failing to ensure breaking at the score line of the third section.

If trial is made to raise the leaf by inserting a stiletto or the like over a side 11 and under the teeth 18 the central rib 13 on the base will prevent the implement from passing to the far side.

Should it be desirable a crest or other marking may be placed on the face of the third section that is exposed when the seal is closed to make it more evident if this section is broken off.

Stiffening ribs may be embossed on the leaf inwardly of the flanges if desired, as shown at 28 in Figures 3, 4, 6 and 8.

The embodiments of the invention in which an exclusive property or privilege is claimed are defined as follows:

1. A seal comprising a base portion, an intermediate leaf at one end of the base portion, a tongue spaced from the longitudinal edges of the leaf projecting from the free end thereof and a third section at the other end of the base portion, said section provided with an orifice adjacent the junction of the base portion and said section, said orifice being as long as the tongue and complementary in shape and position thereto, to receive the tongue when the leaf is first folded onto the base portion, the section being subsequently folded onto the leaf.

2. A seal according to claim 1, upstanding sides on said base portion, a longitudinal central rib forming channels between the rib and sides and upstanding flanges on the leaf to hold material between the channels and flanges when the leaf is folded.

3. A seal according to claim 1, upstanding sides on said base portion, a longitudinal central rib forming channels between the rib and sides, upstanding flanges on the leaf and teeth on the flanges to grip material when the flanges are folded into the channels.

4. A one piece safety seal comprising a dished base portion having upstanding sides, a central rib, channels between the rib and sides; and intermediate leaf at one end of the base portion, toothed flanges upstanding along the longitudinal edges of the leaf, a tongue projecting from the free end thereof spaced from said edges, a transverse scoring at the junction of the base portion and leaf; a third section at the other end of the base portion having a second scoring at the junction of said section and base portion, said section provided with an orifice housing the full length of the tongue therein when the leaf is folded onto the base portion, leaving the tongue projecting therethrough when the section is subsequently folded onto the leaf and means to prevent accidental raising of the section when the leaf and section are folded over onto the base portion.

5. A one piece safety seal as in claim 4, said means comprising a rib between the flanges of the leaf, to protect the free end of the folded section.

6. A one piece safety seal as in claim 4, said means comprising a housing on the leaf and a pointed end on the section adapted to enter the housing.

References Cited in the file of this patent

UNITED STATES PATENTS

| | | |
|---|---|---|
| 1,945,965 | Behrman | Feb. 6, 1934 |
| 2,311,152 | Canter | Feb. 16, 1943 |

FOREIGN PATENTS

| | | |
|---|---|---|
| 395,533 | France | Jan. 4, 1909 |